Patented Jan. 6, 1948

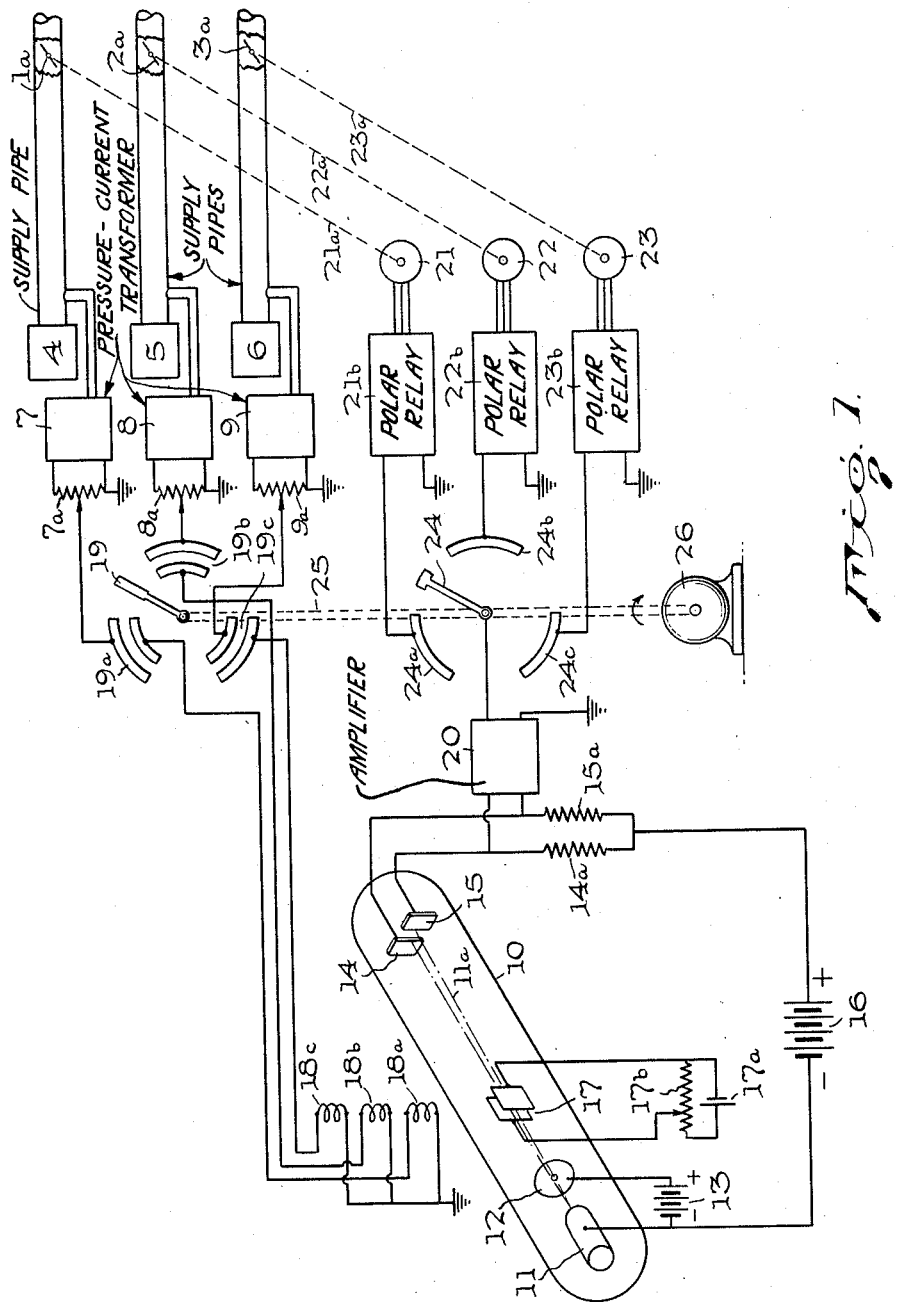

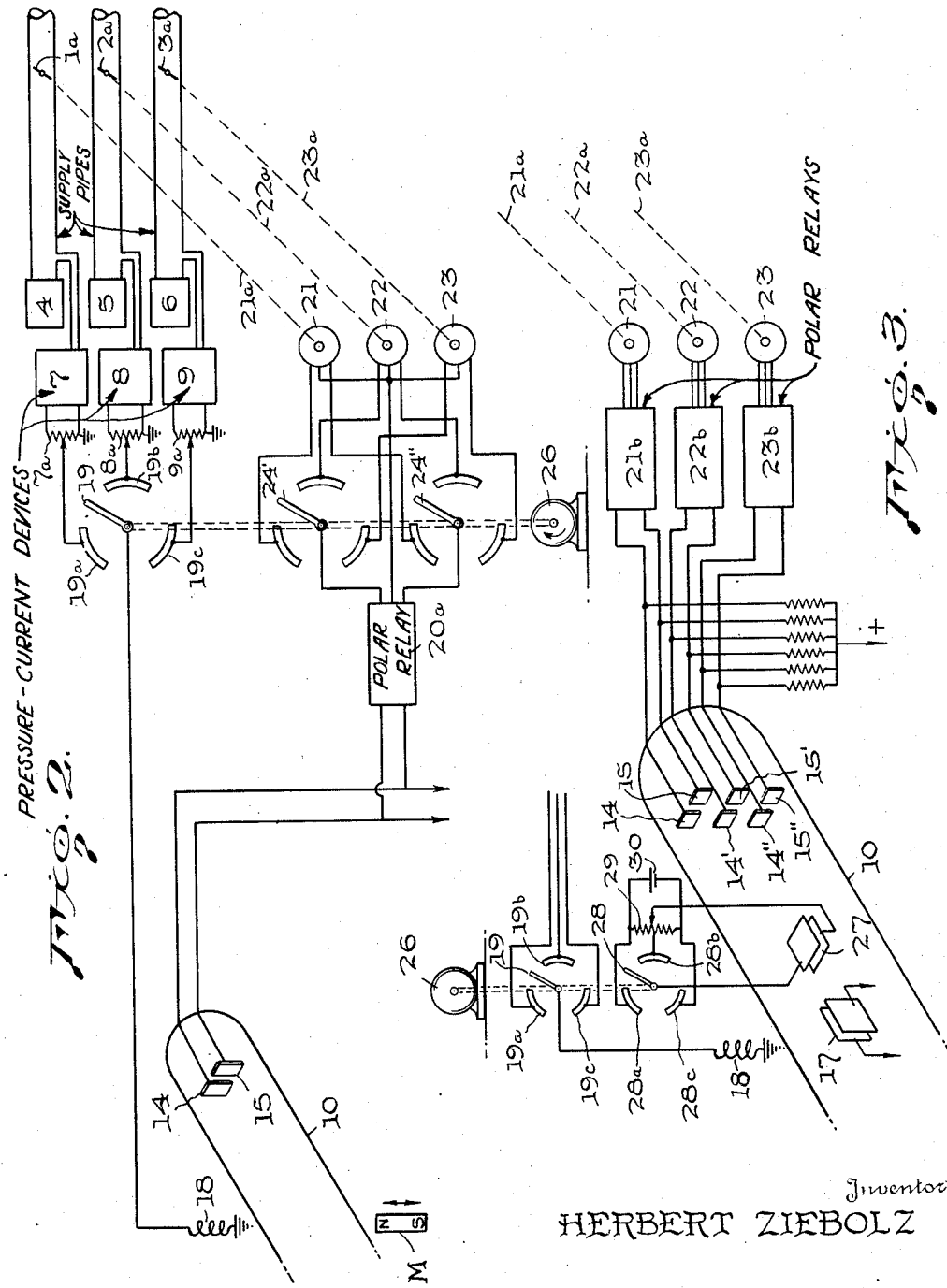

2,434,189

UNITED STATES PATENT OFFICE 2,434,189

MULTIPLE REGULATOR SYSTEM

Herbert Ziebolz, Chicago, Ill., assignor to Electronbeam, Ltd., Chicago, Ill., a partnership Application November 30, 1943, Serial No. 512,394

8 Claims. (Cl. 318—19)

This invention relates to regulator systems for regulating various physical conditions such as temperature, pressure and the like. The invention is especially concerned with the use of a single control relay for simultaneously regulating a plurality of different conditions.

In industrial plants where a number of regulators are required for the simultaneous control of different physical conditions, it is desirable to decrease the number of necessary individual controls, and it is an object of the present invention to devise a control system whereby a single control relay serves to simultaneously control or regulate a number of different independent conditions. Such an arrangement has several advantages in that it involves a reduced initial cost of the regulating apparatus, lower maintenance cost and smaller space and weight requirements.

In the various modifications which I have selected for the purpose of illustrating the present invention, I have shown a control relay in the form of an electronic tube of the cathode ray or electron beam type, but it will be understood that other forms of relays may be employed.

The invention is illustrated in the accompanying drawing in which

Figure 1 is a diagram illustrating a multiple regulator arrangement in which a single electron beam relay is employed for maintaining constant pressure in three pipe lines;

Figure 2 is a diagram similar to Figure 1 showing a modified arrangement for deflecting the electron beam of the control relay; and Figure 3 is a fragmentary diagram similar to Figure 1 illustrating a modified form of the regulator system wherein the electron beam relay tube is provided with a plurality of pairs of anodes for individually controlling the various conditions, and the electron beam is deflected successively to cooperate with the various pairs of anodes in a predetermined sequence.

Referring to the drawing 1, 2 and 3 represent pipe lines for supplying fluid, such as gas or liquid, under pressure to any suitable apparatus represented at 4, 5 and 6 which requires a constant pressure of the fluid supply. It will be understood that the fluid pressure supplied to the apparatus is subject to change, either by reason of changes in the pressure of the source of fluid, or by changes in the consuming apparatus, and the problem is to maintain a constant pressure at the intake for the apparatus. For the purpose of regulating the pressure supplied to the different consuming devices, control or regulating valves 1a, 2a and 3a are provided in the respective pipe lines, and suitable pressure responsive devices 7, 8 and 9 are connected to the respective pipe lines between the control valve and the consuming apparatus. Each pressure responsive device responds to the pressure in the associated pipe line and produces a direct current or voltage in its output circuit proportional to the pressure applied to the device. Suitable potentiometers 7a, 8a and 9a are connected in the output circuits of the pressure responsive devices by which a desired portion of the generated voltage may be employed for controlling the control relay. Various forms of pressure responsive devices are known and the details need not be described.

The control relay comprises an electronic tube of the cathode ray or electron beam type and may be formed in a known manner. For the purpose of illustration, the relay is formed of an insulating envelope 10 enclosing an electron gun or cathode element 11 which supplies electrons to form a cathode ray or electron beam which passes through a perforated anode 12 which is maintained at a positive potential with respect to the gun 11 by a source of potential represented by the battery 13. The electron beam is represented by the dotted lines 11a and is directed towards target anodes 14 and 15 positioned in the opposite end of the tube from the gun 11. Anodes 14 and 15 are maintained at a positive potential with respect to the cathode by suitable connections to a source of voltage 16 through coupling resistances 14a and 15a. Beam deflecting means represented by a pair of deflecting plates 17 is provided for fixing the initial position of the beam, and these plates are supplied with an adjustable voltage from a suitable source represented by the battery 17a through potentiometer 17b. The potentiometers 7a, 8a and 9a in the output circuits of pressure responsive devices 7, 8 and 9 are connected to energize beam deflecting coils 18a, 18b and 18c, each of which is arranged to deflect the beam in an opposite direction from deflecting plates 17. It will be understood that in all cases the deflecting means tends to shift the beam 11a from one target anode towards the other, and vice versa. Deflecting plates 17 constitute biasing means normally acting to bias the relay in a direction opposite to the direction of action of coils 18a, 18b and 18c.

In order that only one deflecting coil shall be effective at any given time, a rotary switch is interposed in the connections from pressure responsive devices 7, 8 and 9. This switch may assume various forms, but for the purpose of illustration it may consist of a switch having three pairs of stationary segmental contacts 19a, 19b and 19c arranged about the axis of a rotary arm carrying a bridging contact 19. As will be seen from the drawing, contacts 19a, 19b and 19c are included in the connections leading from potentiometers 7a, 8a and 9a, respectively, so that the circuits to deflecting coils 18a, 18b and 18c are completed in succession and only one coil is energized at any given time.

The output circuit of the electron beam relay is connected across anodes 14 and 15 and may include an amplifier 20. It will be understood that whenever the beam 11a is deflected from its neutral position midway between anodes 14 and 15, a difference of potential will be applied to the input circuit of amplifier 20, and the polarity of this potential will depend upon the direction of deflection of the beam. Accordingly, the controlling potential derived from the output circuit of the control relay is reversible in polarity depending upon the relative action between deflecting plate 17 and one of the deflecting coils controlled by the pressure responsive devices 7, 8 and 9.

The output signals from the electron beam relay are employed to control reversible motors 21, 22 and 23 which in turn operate control valves 1a, 2a and 3a through any suitable connections represented by the dotted lines 21a, 22a and 23a. The output circuit of amplifier 20 is connected successively to the input circuits of polarity responsive relays 21b, 22b and 23b by means of a rotary switch having a rotary contact 24 cooperating with three segmental contacts 24a, 24b and 24c connected respectively to the input circuits of relays 21b, 22b and 23b. Rotary bridging member 19 and rotary arm 24 may be mounted on a common shaft 25 which is driven at a constant rate of speed by means of a suitable motor 26. These two rotary elements are mounted in fixed relation on the shaft 25 so that when the output circuit of one of the pressure responsive relays 7, 8 and 9 is completed to control the beam relay, the relay output circuit is completed by contact 24 to the motor which controls the valve in the pipe line which is exercising control over the beam relay.

The polarity responsive relays 21b, 22b and 23b for controlling reversible motors 21, 22 and 23 may be of known construction whereby the direction of operation of each motor is determined by the polarity applied to the input circuit of the relay.

The operation of Figure 1 is as follows: Motor 26 driving the rotary switches or distributors 19 and 24 is driven at a speed such that the time interval during which the control tube is disconnected from any given pressure responsive device is relatively short as compared with the time required for appreciable change in the condition under regulation. As the two distributors rotate, the input circuit of the control relay is connected successively to the various pressure responsive devices, and the output circuit of the relay is simultaneously shifted for connection to control the control valve in the corresponding pipe line. During the interval when the control relay is connected to any given pipe line, the pressure responsive device controls the position of the electron beam in accordance with the existing pressure condition, and if the pressure is not at the normal or set value, the beam will be deflected from its neutral position and will energize the corresponding valve operating motor for operation in proper direction to restore the pressure to its set value. The same operation takes place for the other pipe lines as the control relay is connected successively to the control apparatus for these lines. Since the period of interruption of regulation on any given pipe line is relatively short by comparison with the rate of change of the condition, there will be no substantial change in the condition during periods of interruption, and the desired pressure conditions will be maintained substantially constant on all three lines, even though a single control relay is employed. It will be understood that the pressure to be maintained on the various pipe lines may be set at the desired values by adjusting the positions of the sliding contacts on potentiometers 7a, 8a and 9a. These potentiometers constitute individual magnitude-setting means for the three conditions being regulated. Also, potentiometer 17b controlling the bias on the cathode ray relay constitutes common magnitude-setting means for all three conditions. Increasing the potential applied to plates 17 will increase the values of all three conditions, and decreasing the potential will have the opposite effect.

The periods of interruption of regulating action on the various pipe lines provide times in which conditions in the various systems may settle down and this contributes towards the stability of the regulating action.

When the system is employed for regulating temperature, the consuming apparatus 4, 5 and 6 might embody a heater or burner supplied with fuel from the associated pipe lines, and the devices 7, 8 and 9 would comprise temperature responsive devices, such as thermocouples, arranged to respond to the temperatures of the various heaters. It will be obvious that my control system may be employed for regulating other physical conditions than those specifically referred to herein.

Figure 2 is a diagram illustrating a modification of the system shown in Figure 1. In this arrangement, elements corresponding to similar elements in Figure 1 are indicated by like reference numerals.

The electron beam control relay is of the same construction as in Figure 1, except that the beam setting means, instead of being formed of a pair of deflecting plates, comprises a movable magnetic field produced by any suitable means such as the movable magnet M, although the arrangement shown in Figure 1 may be employed if desired. Also, instead of employing three deflecting coils as in Figure 1, only one coil 18 is employed and this coil is connected successively to potentiometers 7a, 8a and 9a by means of rotary distributor arm 19 cooperating with stationary segmental contacts 19a, 19b and 19c.

The output circuit of the beam relay of Figure 2 also differs from Figure 1 in that a single polarity responsive relay 20a is employed for controlling the direction of operation of motors 21, 22 and 23, the polarity responsive relay being connected to these motors in succession by means of a pair of rotary distributor arms 24' and 24''. The central wire of the three-wire output circuit of relay 20a is connected directly to the central conductors on the three motors, and one outside conductor controlling one direction of operation is completed through distributor arm 24', while the connection for the other outside conductor for controlling the other direction of operation is completed through distributor arm 24''. All three distributor arms 19, 24' and 24'' are driven in synchronous relation by the motor 26.

The operation of Figure 2 will be readily understood from the foregoing description of the operation of Figure 1. The main advantage of Figure 2 over Figure 1 is the simplification which results from elimination of two of the deflecting coils and also elimination of two of the polarity responsive motor controlling relays. Magnet M serves as a common biasing means or magnitude-setting means in a manner similar to deflecting plates 17 in Figure 1.

Figure 3 is a fragmentary diagram showing a further modification of the arrangement illustrated in Figure 1. Elements which correspond to similar elements in Figures 1 and 2 are indicated by like reference numerals.

In Figure 3 a single deflecting coil 18 is employed as in Figure 2 and is connected successively to potentiometers 7a, 8a and 9a by means of rotary distributor arm 19. Deflecting plates 17 are provided as in Figure 1 for the initial setting of the beam, but a magnetic setting means may be used as in Figure 2.

Instead of having only two target anodes and one output circuit, the beam relay of Figure 3 is provided with three sets of target anodes and three output circuits for individually controlling the reversible motors 21, 22 and 23 through the polarity sensitive relays 21b, 22b and 23b. The pairs of anodes are arranged along a common switching axis or path positioned at right angles to the axis of deflection of the beam by coil 18. As will be seen from Figure 3, anodes 14 and 15 control motor 21, anodes 14' and 15' control motor 22, and anodes 14'' and 15'' control motor 23. Each anode is connected to the positive terminal of a source of plate current through a suitable coupling resistance as shown.

In order to render only one set of anodes effective at any given instant, I provide means for deflecting the beam in a vertical direction along the common axis of the anode pairs to shift the beam successively from one pair of anodes to another. Such beam deflecting means may comprise a pair of horizontal plates 27 across which a suitable deflecting potential is impressed to shift the beam vertically. For example, the beam may normally be directed towards the central pair of anodes 14'—15', and by applying a potential of one polarity between plates 27 the beam will be shifted upwardly to cooperate with the upper pair of anodes, and by applying a potential of reverse polarity to plates 27 the beam will be shifted downwardly to cooperate with the lower pair of anodes. Suitable deflecting potentials may be obtained by means of a rotary distributor arm 28 which is arranged to connect one of plates 27 to the central point or to the opposite terminals of a potentiometer resistance 29 which is supplied with current from a suitable source represented by the battery 30, the other plate 27 being connected to a movable contact on potentiometer 29. Distributor arm 28 cooperates with three stationary contacts 28a, 28b and 28c which are connected to the upper, central and lower terminals, respectively, of potentiometer 29. When arm 28 is in contact with segment 28b, the movable contact on potentiometer 29 is adjusted until the beam is in proper position to cooperate with the central pair of anodes 14'—15'. Distributor arms 19 and 28 are driven synchronously by motor 26 and in such relative relation that the beam of the control tube is cooperating with the proper pair of anodes when arm 19 is connected with the corresponding pressure responsive device.

Operation of Figure 3 is as follows: By the rotation of distributor arms 19 and 28, the beam control relay is successively connected to regulate the pressure condition in the different supply lines. When arm 19 is in contact with segment 19a connected to potentiometer 7a, arm 28 is in contact with segment 28a and the electron beam of the control relay is deflected upwardly to cooperate with anodes 14—15 which control motor 21 which actuates control valve 1a in line 1. The pressure responsive device connected with line 1 controls the current flowing through deflecting coil 18 which determines the amount of lateral deflection of the beam and therefore determines whether or not the motor 21 will be operated in one direction or the other during the time that distributor arms 19 and 28 are passing over segments 19a and 28a. If the pressure supplied by line 1 is not of the proper value, motor 21 will be energized to move valve 1a in a direction to correct the pressure. In a like manner, the control relay will serve to regulate the pressure in line 2 during the time that arms 19 and 28 are passing over segments 19b and 28b. During this time the electron beam will be cooperating with anodes 14'—15'. The pressure in line 3 will be regulated by the control relay during the time that arms 19 and 28 are passing over segments 19c and 28c. When arm 28 passes from segment 28c to 28a, the beam is shifted quickly from the lower pair of anodes 14''—15'' to the upper pair of anodes 14—15.

It will be obvious to those skilled in the art that various other details may be modified without departing from the principle of the invention.

I claim:

1. In a regulator system, the combination of a plurality of movable elements for varying the magnitudes of a corresponding number of conditions, individual actuating devices for said condition varying elements, individual devices responding to the magnitudes of said conditions, a control relay having input means subject to control by said condition responsive devices and output means for controlling said actuating devices, magnitude-setting means normally biasing said relay for operation in a direction for increasing the magnitudes of said conditions, and distributor means for successively connecting the input means of said relay to be controlled by said condition responsive devices in opposition to said magnitude-setting means and for simultaneously rendering said relay operative to control the corresponding actuating devices for regulating said conditions periodically and in a predetermined sequence.

2. A regulator system according to claim 1 and including individual magnitude-setting means for varying the control of each condition responsive device upon said relay.

3. In a regulator system, the combination of a plurality of movable elements for varying the magnitudes of a corresponding number of conditions, individual reversible actuating devices for said condition varying elements, individual devices responding to the magnitudes of said conditions, a control relay comprising an electron beam tube having means in the input circuit thereof for deflecting the beam along a deflection axis, a plurality of pairs of anodes arranged in spaced relation along a switching axis transversely of said deflection axis, the anodes of each pair being arranged on opposite sides of said switching axis, connections from said pairs of anodes for individually controlling said reversible actuating devices, beam deflecting means for deflecting said electron beam along said switching axis, a distributor switch for connecting the input circuit of said relay successively to said condition responsive devices in a predetermined sequence, and a second distributor switch operated synchronously with said first switch for controlling said second beam deflecting means to cause said beam successively to cooperate with said pairs of anodes in the same sequence.

4. In a regulator system, the combination of a plurality of movable elements for varying the magnitudes of a corresponding number of conditions, individual actuating devices for said condition varying elements, individual devices responding to the magnitudes of said conditions, a control relay comprising an electron beam tube having means in the input circuit thereof for deflecting the beam along a deflection axis, biasing means tending to deflect said beam in one direction along said deflection axis, a plurality of pairs of anodes arranged in spaced relation along a switching axis transversely of said deflection axis, the anodes of each pair being arranged on opposite sides of said switching axis, connections from said pairs of anodes for individually controlling said actuating devices, beam deflecting means for deflecting said electron beam along said switching axis, a distributor switch for connecting the input circuit of said relay successively to said condition responsive devices in a predetermined sequence and in a direction to oppose the deflection of said beam by said biasing means, and a second distributor switch operated synchronously with said first switch for controlling said second beam deflecting means to cause said beam successively to cooperate with said pairs of anodes in the same sequence, said biasing means serving to deflect said beam in a direction for increasing the magnitudes of said conditions.

5. In a regulator system, the combination of a plurality of movable elements for varying the magnitudes of a corresponding number of conditions, individual reversible electric motors for actuating said condition varying elements, individual devices responding to the magnitudes of said conditions and producing voltages proportional thereto, a control relay comprising an electron beam tube having beam deflecting means connected in the input circuit thereof and a pair of anodes positioned in the path of the beam and connected with the output circuit thereof, a distributor switch for successively connecting the input circuit of said relay to said condition responsive devices, a second distributor switch operated synchronously with said first switch for successively connecting the output circuit of said relay to energize said reversible motors for operation in one direction or the other in accordance with the direction of deviation of said conditions from predetermined values, and biasing means normally tending to deflect said beam in a direction to increase the magnitudes of said conditions, and said condition responsive devices tending to deflect said beam in a direction to decrease the magnitudes of said conditions.

6. In a regulator system, the combination of a plurality of movable elements for varying the magnitudes of a corresponding number of conditions, individual actuating devices for said condition varying elements, individual devices responding to the magnitudes of said conditions, a control relay comprising an electron beam tube having means in the input circuit thereof for deflecting the beam in one direction, a plurality of output anodes arranged in the path of said beam and positioned in a path transversely of said direction, connections from said output electrodes for individually controlling said actuating devices, beam deflecting means for deflecting said electron beam along the path of said electrodes, a distributor switch for connecting the input circuit of said relay successively to said condition responsive devices in a predetermined sequence, a second distributor switch operated synchronously with said first switch for controlling said second beam deflecting means to cause said beam to successively cooperate with said output electrodes in the same sequence, and biasing means normally tending to deflect said beam in a direction to increase the magnitudes of said conditions, and said condition responsive devices tending to deflect said beam in a direction to decrease the magnitudes of said conditions.

7. In a regulator system, the combination of a plurality of movable elements for varying the magnitudes of a corresponding number of conditions, individual reversible electric motors for actuating said condition varying elements, individual devices responding to the magnitudes of said conditions and producing voltages proportional thereto, a control relay comprising an electron beam tube having beam deflecting means connected in the input circuit thereof and a pair of anodes positioned in the path of the beam and connected with the output circuit thereof, a distributor switch for successively connecting the input circuit of said relay to said condition responsive devices, a polarity responsive relay connected to the output circuit of said tube and having two output circuits suitable for operating said reversible motors in opposite directions, a second distributor switch operated synchronously with said first switch for successively connecting the output circuits of said polarity responsive relay to energize said reversible motors for operation in one direction or the other in accordance with the direction of deviation of said conditions from predetermined values, and biasing means normally tending to deflect said beam in a direction to increase the magnitudes of said conditions, and said condition responsive devices tending to deflect said beam in a direction to decrease the magnitudes of said conditions.

8. In a regulator system, the combination of a plurality of movable elements for varying the magnitudes of a corresponding number of conditions, individual reversible electric motors for actuating said condition varying elements, individual polarity responsive relays for controlling the direction of operation of said motors, inividual devices responding to the magnitudes of said conditions and producing voltages proportional thereto, a control relay comprising an electron beam tube having beam deflecting means connected in the input circuit thereof and a pair of anodes positioned in the path of the beam and connected with the output circuit thereof, a distributor switch for successively connecting the input circuit of said relay to said condition responsive devices, a second distributor switch operated synchronously with said first switch for successively connecting the output circuit of said relay to the input circuits of said polarity responsive relays to energize said reversible motors for operation in one direction or the other in accordance with the direction of deviation of said conditions from predetermined values, and biasing means normally tending to deflect said beam in a direction to increase the magnitudes of said conditions, and said condition responsive devices tending to deflect said beam in a direction to decrease the magnitudes of said conditions.

HERBERT ZIEBOLZ.

REFERENCES CITED

The following references are of record in the file of this patent:

UNITED STATES PATENTS

| Number | Name | Date |
|---|---|---|
| 374,872 | Hochhausen | Dec. 13, 1887 |
| 1,792,256 | Stewart | Feb. 10, 1931 |
| 2,027,393 | McCreary | Jan. 14, 1936 |
| 2,057,773 | Finch | Oct. 20, 1936 |
| 2,096,012 | Soller | Oct. 19, 1937 |
| 2,122,102 | Lundell | Jan. 28, 1938 |
| 2,265,216 | Wolf | Dec. 9, 1941 |
| 2,047,984 | Riggs | July 21, 1936 |
| 2,214,019 | Gray | Sept. 10, 1940 |
| 2,314,302 | Ziebolz | Mar. 16, 1943 |
| 2,339,861 | Keeler | Jan. 25, 1944 |